G. L. WINSHIP.
Sights for Fire-Arms.

No. 198,231.  Patented Dec. 18, 1877.

Witnesses;
James K. Winn
Annie C. Winn

Inventor
G. L. Winship

UNITED STATES PATENT OFFICE.

GUSTAVUS L. WINSHIP, OF BOSTON, MASSACHUSETTS.

IMPROVEMENT IN SIGHTS FOR FIRE-ARMS.

Specification forming part of Letters Patent No. 198,231, dated December 18, 1877; application filed March 23, 1877.

*To all whom it may concern:*

Be it known that I, GUSTAVUS L. WINSHIP, of Boston, county of Suffolk, and State of Massachusetts, have invented a new and useful Improvement in Rear Sights for Rifles, of which the following is a specification:

This invention relates to certain improvements in rear rights for rifles. It is of that class usually termed "peep-sights;" and consists of certain arrangements by which the sight can be made to slide loosely on the frame by which it is supported, so as to be quickly set in any position, and yet be susceptible of the finest adjustment by the aid of the screw and vernier.

The frame that supports the slide and sight has a screw running its whole length, which is embedded in the frame, so that one-half its diameter projects above the surface. A half-nut, having threads to correspond with the screw, is attached to the slide that carries the sight by a flexible piece of metal, which has a projection that rests on a cam-surface on the back of the eye-piece, and is so arranged that when the eye-piece, which serves as a nut to hold the slide, is turned partially round, the half-nut will be raised and disengaged from the screw, when the slide may be moved to any point desired. A reverse movement of the eye-piece causes the half-nut to fall and engage again with the screw, when it may be adjusted to any degree of fineness desired, the edge of the frame and of the slide being graduated in vernier for that purpose.

In the drawings, Figure 1 is a side view of my invention. A is the frame. B is the eye-piece. C is the screw, embedded half its diameter in the frame A. At $b$ is shown the cam-surface on the back of the eye-piece B. $b'$ is the projection on the spring that holds the half-nut $c$.

Figure 1:
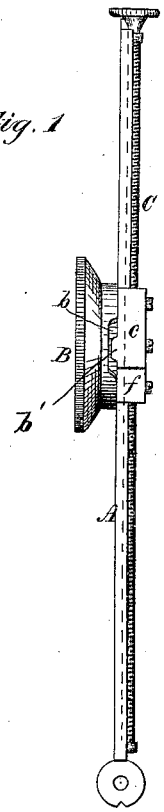
Figure 2:
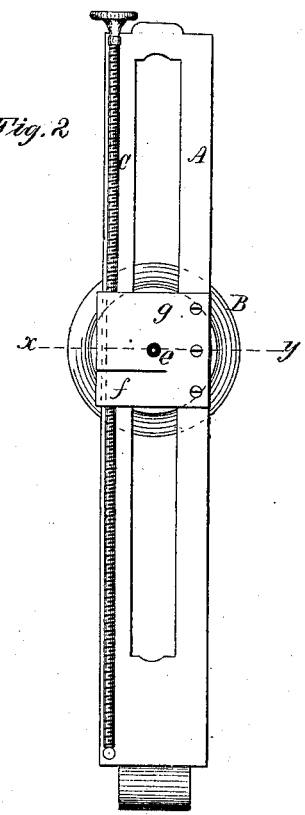
Fig. 2 is a back view, showing the same parts in a different position, and more clearly, and the back of the slide, with the spring $g$, on which is formed the half-nut $c$.
Figure 3:
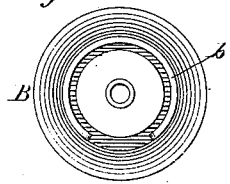
Fig. 3 shows the back of the eye-piece B, with cam-surface $b$. The groove shown is only for convenience of manufacture.
Figure 4:
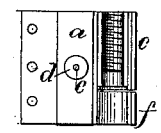
Fig. 4 shows the inner side of the slide $a$. $c$ is the half-nut, and $d$ the screw on which the eye-piece B turns, and in the center of which is the sight $e$. $f$ is a rest that bears on the screw.
Figure 5:
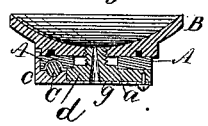
Fig. 5 is a section taken through the line $x\,y$, Fig. 2, showing all the parts in position.

The operation of my invention is thus described: The frame A being secured to the stock of the rifle in the ordinary manner, and set in a vertical position, if it is desired to move the sight from its lowest position to near the top of the frame, the eye-piece B is turned so as to loosen the gripe of the screw, when the higher portion of the cam-surface $b$ is brought against the projection $b'$, causing it to raise the half-nut $c$, and disengage it from the screw C, when the slide can be raised at once to the position desired. A reverse motion of the eye-piece B and cam-surface $b$ brings the half-nut $c$ again in contact with the screw C, by a slight turning of which the slide may be adjusted and read off on the vernier.

It will be seen that by this arrangement the tedious operation of moving the slide a long distance by turning the screw is avoided, and that the advantage of the fine screw for accurate adjustment is retained.

The vernier is on the side of the frame not shown in the drawings.

Having thus fully described the nature and operation of my invention, what I claim as new, and desire to secure by Letters Patent, is—

In a rear sight for rifles, the slide $a$, with spring $g$, half-nut $c$, and projection $b'$, operating in combination with the cam-surface $b$ on the eye-piece B, and the embedded screw C, substantially as and for the purpose specified.

G. L. WINSHIP.

Witnesses:
JAMES H. WINN,
AMMI C. WINN.